Figure 1:
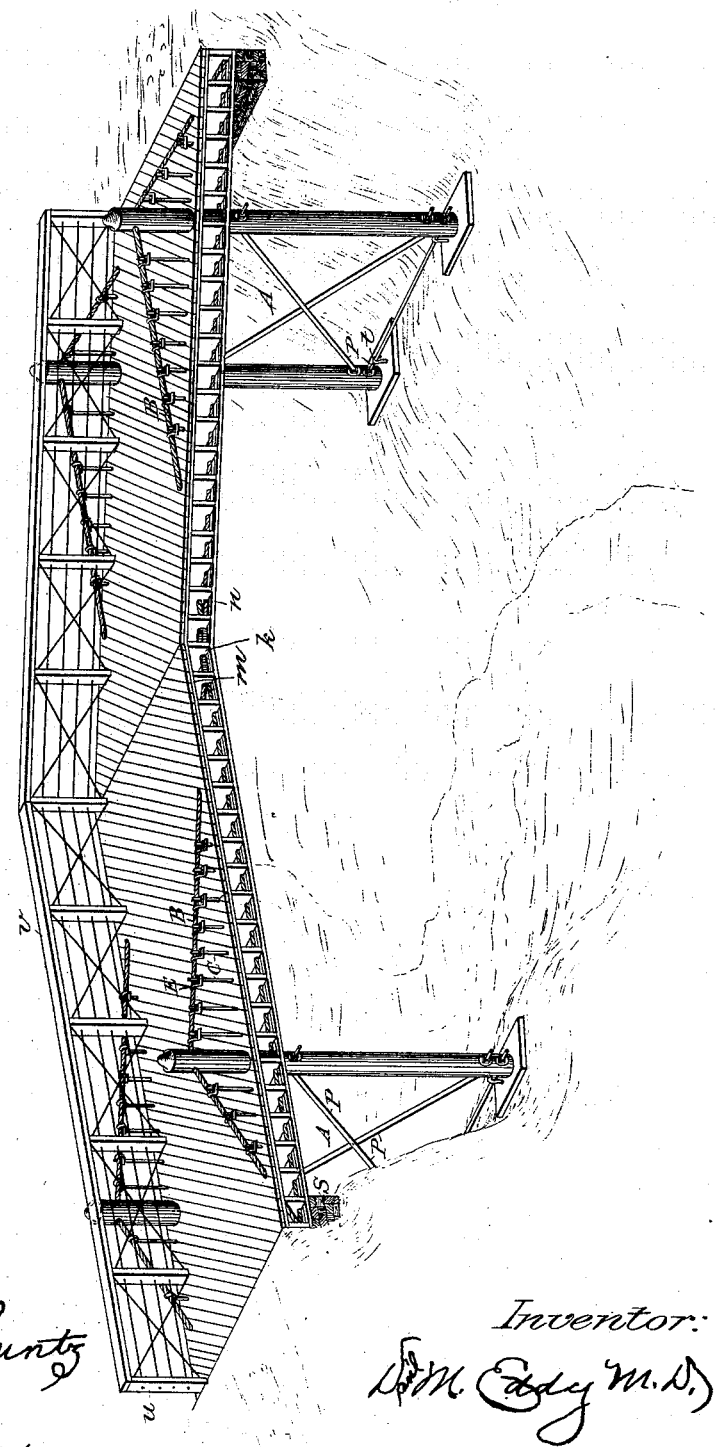

(No Model.) 2 Sheets—Sheet 1.

D. M. EDDY.
BRIDGE.

No. 389,694. Patented Sept. 18, 1888.

Witnesses:
George N Lantz
Annie M. Eddy

Inventor:
D. M. Eddy M.D.

(No Model.) 2 Sheets—Sheet 2.
D. M. EDDY.
BRIDGE.
No. 389,694. Patented Sept. 18, 1888.
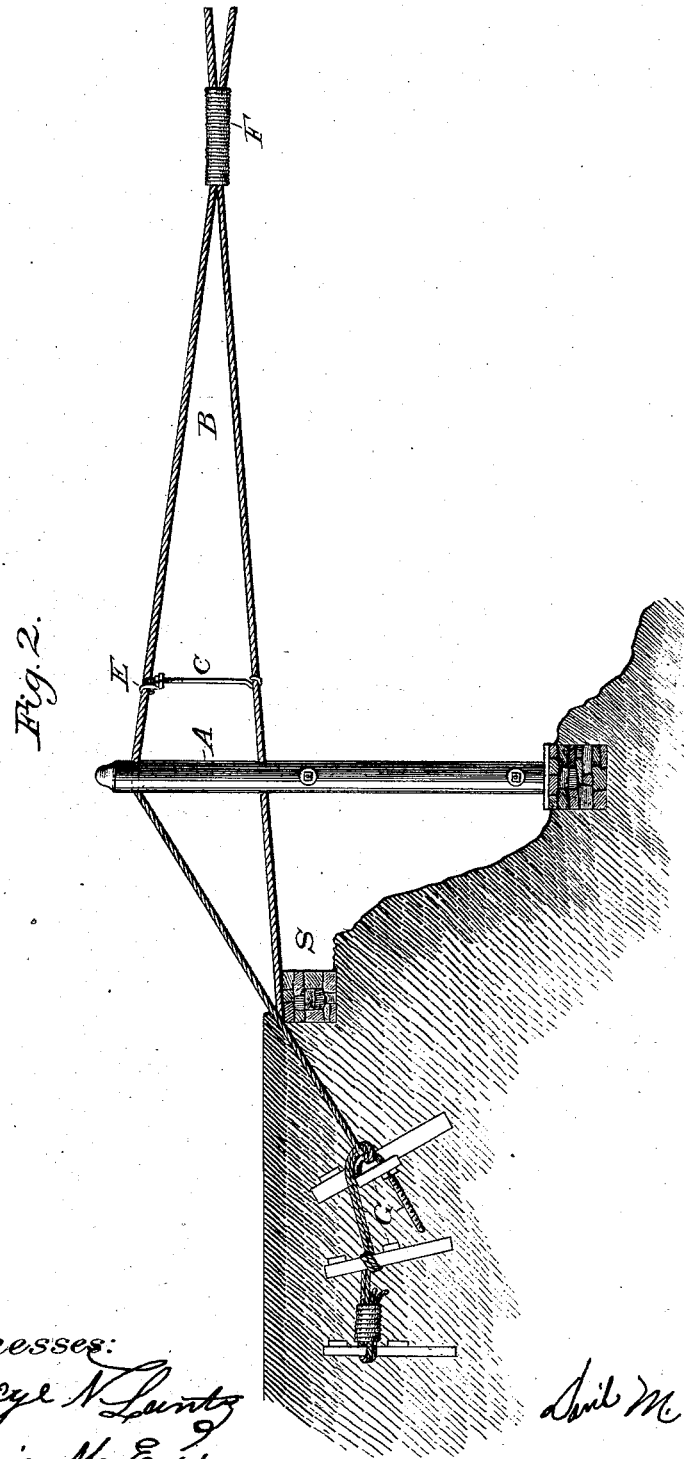
Witnesses:
George N. Leintz
Annie M. Eddy
Inventor:
David M. Eddy M.D.

UNITED STATES PATENT OFFICE.

DANIEL M. EDDY, OF SEDAN, KANSAS.

BRIDGE.

SPECIFICATION forming part of Letters Patent No. 389,694, dated September 18, 1888.

Application filed January 3, 1888. Serial No. 259,705. (No model.)

*To all whom it may concern:*

Be it known that I, DANIEL M. EDDY, a citizen of the United States, residing at Sedan, in the county of Chautauqua and State of Kansas, have invented certain new and useful Improvements in Bridges, of which the following is a description.

My invention relates to improvements in cable bridges, and which I will now proceed to describe.

In the accompanying drawings, Figure 1 is an elevated quartering side view of the bridge with one banister removed. Fig. 2 is a side elevation of bent, showing cables passing through the bents over the bearings, showing manner of tightening and anchoring, these views being necessary to illustrate the bridge.

A, Fig. 1, is the bent; B, the cables; C, the rods connecting the cables; E, stirrups for rods to pass through. F, Fig. 2, shows the manner of wrapping the cables where they pass; G, large bolt with hook on one end for tightening cables, also shows posts set down in the ground to support cables. The bents are held together by the long bolts P and adjusted by the nuts on the bolts P, as shown in the cut, Fig. 1, the lower end of the bents resting in a foundation of masonry. The cables pass through apertures made in the bents, the cables on each side passing each other in the center of the bridge on the incline and forming between the bents the letter X lying on its side. Uniting, the cables pass over the bearings S, Fig. 2, into the earth, where they are firmly secured around iron posts set in masonry. The cables are wrapped or securely fastened in the center of the span, where they pass or cross, as shown at F, Fig. 2. The girders upon which the roadway is placed are notched near each end and placed upon the cables in such a manner as that the notches may rest upon and over the cables, as shown at K, Fig. 1.

A rib-board, *m*, Fig. 1, is fitted into the ends of these beams or girders on the upper surface the length of the bridge on each side to support the roadway; also a rib, *n*, Fig. 1, underneath. (Not notched.) The planks which constitute the roadway are laid upon these girders on the bias, as shown in the accompanying cut. The rods C are made with a hook on one end, which catch up the lower cables. The other end passes up through the plank through the stirrup E. A nut upon the upper end may be tightened down to any tension. It can thus make my bridge take the form of a beautiful arch, with a gradual rise from each bent to the center of the bridge.

The great advantage of my new bent comes from making the cables pass directly through apertures made in the upper portion of the bents, making the bents and cables inseparable in case of high water. It is impossible in overflows to dislodge or separate the cables from the bents. The bearing S supports the cables, as shown in the cut. The lower ends of the bents are held in place by hooked iron rods passing down into the stone-work and embedded therein. The upper ends are hooked over the lower horizontal bar, P, as represented in Fig. 1. The rod C, Fig. 2, shows manner of attaching the upper and lower cables. My banister adds strength and support to the bridge. The uprights *n* support the railing *v*. The uprights are run down through the floor and bolted to the girders. Holes are made in them and wires run through from one end of the bridge to the other. This banister is light, strong, and helps to support the bridge.

I do not claim the right of cable bridges, broadly, as I am aware there have been cable bridges for many years—suspension-bridges whose support comes from upper cables alone.

I am aware, also, that there are other cable bridges not similar to mine—bridges composed of five cables lying horizontally, having the flooring laid immediately upon the cables; also, a cable bridge of seven cables passing over high bents. The two upper cables catch up the lower cables underneath, forming a needle-bent. This elevates the center of the bridge; but the two upper cables in this instance must sustain all the other five cables, and the entire bridge as well. My bridge overcomes this, and all four cables sustain an equal capacity. I therefore do not claim the invention of cable bridges, broadly; but What I do claim, and desire to secure by Letters Patent, is—

1. The combination, in a cable bridge, of the bents A, composed of braced columns, as described, the four cables B, two on either side, running through said columns, the cables on either side crossing at the middle of the bridge, and the flooring resting upon girders supported upon the lower sections of the cables upon either side of their intersections, substantially as described.

2. The rods C, hooked at their lower ends and embracing the lower cable and threaded into the hooked stirrup E, embracing the upper cable, all combined as described and set forth.

3. The timbers embedded in the abutment, the end of the upper cable secured thereupon, and the adjusting hook-bolt G, about which a turn of the cable may be taken and adjustment made, substantially as set forth.

DANIEL M. EDDY.

Witnesses:
GEORGE N. LANTZ,
ANNIE M. EDDY.